Jan. 6, 1942.　　　　C. T. McGILL　　　　2,268,607
WATER CONDITIONING APPARATUS
Filed May 20, 1938　　　3 Sheets-Sheet 1
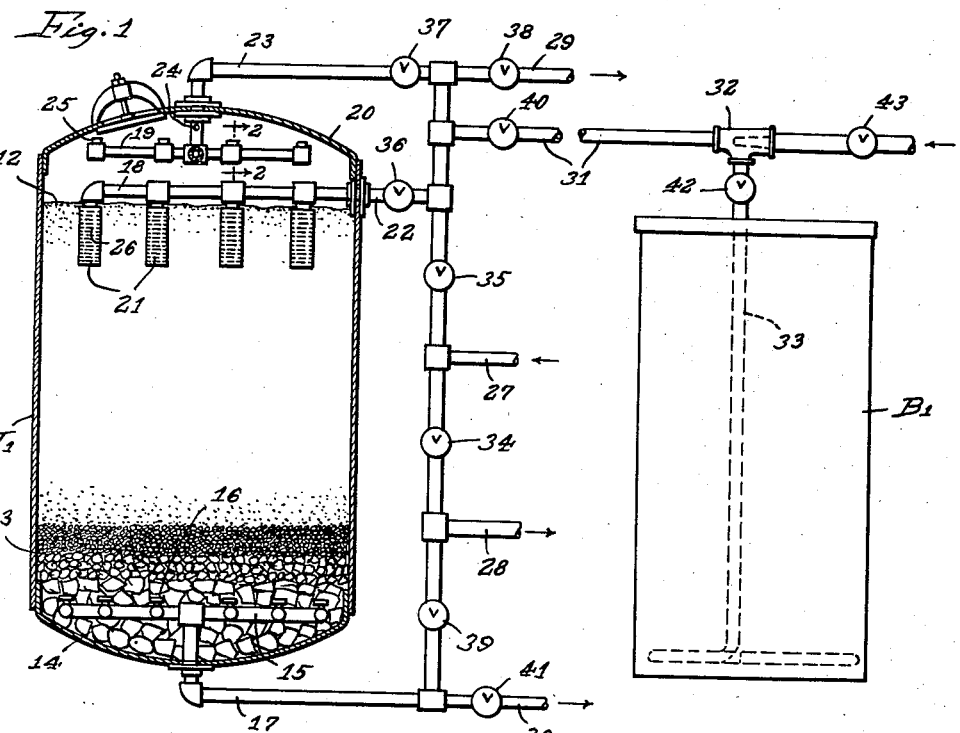
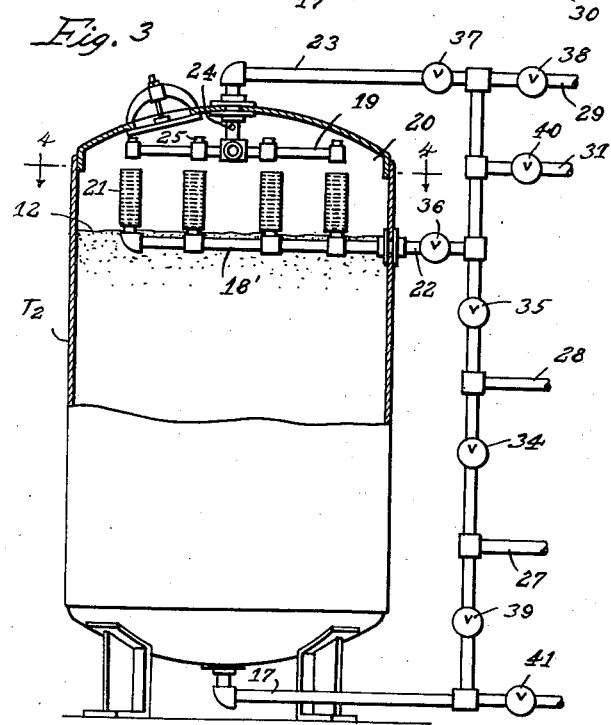
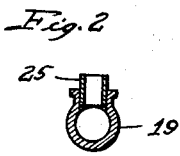
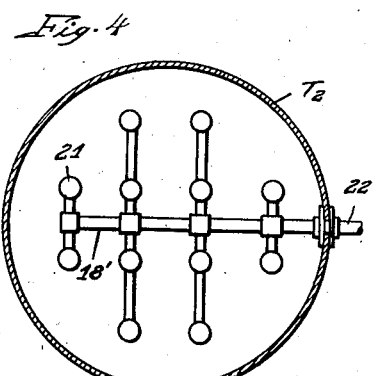
Inventor:
Chester T. McGill
By McCanna, Wintercorn & Morsbach
Attys.

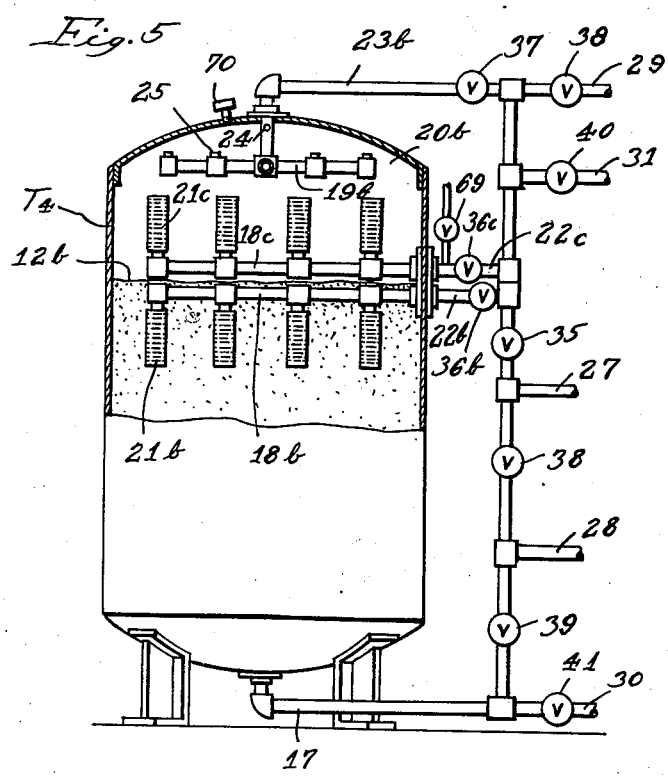

Jan. 6, 1942. C. T. McGILL 2,268,607
WATER CONDITIONING APPARATUS
Filed May 20, 1938 3 Sheets-Sheet 3

Inventor:
Chester T. McGill
By
McCanna, Wintercorn & Morsbach
Attys.

Patented Jan. 6, 1942

2,268,607

UNITED STATES PATENT OFFICE

2,268,607

WATER CONDITIONING APPARATUS

Chester T. McGill, Elgin, Ill.

Application May 20, 1938, Serial No. 208,994

20 Claims. (Cl. 210—24)

This invention relates to water conditioning apparatus such as water softeners and filters.

Downflow water softeners and filters are subject to the objections that the accumulated silt and other foreign matter on the top of the bed results in considerable pressure loss, necessitating backwashing at frequent intervals to clear out these accumulations. Then, too, while downflow operation would permit filling the tank or tanks almost to the top with the water softening or filtering material and thus take full advantage of the tank capacity, the flow rate during backwashing has heretofore dictated the necessity for cutting down the depth of material or increasing the height of the tank in order to provide a freeboard space in the tank over the material sufficient to allow for the expansion of the material during backwashing and minimize loss of material to the drain during backwashing. In these earlier designs it was also important to use fairly coarse softening material having a lower exchange capacity per cubic foot, because finer material would wash out too readily. It is, therefore, the principal object of my invention to provide water conditioning apparatus of such improved design that the freeboard space can be drastically reduced, permitting use of more water softening or filtering material with attendant advantages, while finer, higher capacity softening material may be employed, and backwashing may be done at even higher than usual flow rates without loss of filtering or softening material. It is also an aim of the invention to provide a similar construction in upflow softeners to permit faster flow of water through the softening material than is permitted in conventional type softeners, without danger of loss of material.

Another main object of this invention is to permit passage of water through the coarser material of a bed in backwashing or softening at a faster rate than it is passed through the finer material in the upper portion of the bed. In carrying out this object of my invention, I provide outlets at different levels in the top of the tank with means for regulating the discharge of water through each outlet level in backwashing so as to permit a fast flow rate, sufficient to thoroughly expand the material and efficiently wash the same, but avoid loss of the material to the drain by division of the flow between the outlets, the lower outlets having strainers thereon to retain the material while allowing escape of some of the finer particles of sediment, while the uppermost outlets, where there is a lower flow rate, has nozzles with larger openings to permit removal of all remaining sediment without danger of loss of material, since the flow rate at this highest elevation is slowest.

Another important feature of my invention is the provision in a water conditioning apparatus of means for backwashing and cleansing the top portion of the filtering or softening bed without passing the wash water through the remainder of the bed, thus permitting a faster flow rate with more thorough cleansing of the material at and near the surface of the bed while at the same time furnishing softened or filtered water to the service system.

Another feature is the provision of means in a down-flow water conditioning apparatus permitting introduction of water into a water softening or filtering bed at a point below the top of the bed when the back pressure, due to accumulated sediment on the top of the bed, has built up beyond a certain value, and to permit introducing brine solution similarly to a bed of water softening material at a point below the top of the bed to reduce back pressure so that the brine may be introduced easily by an ejector nozzle.

Still another important feature of the invention as applied to a two-flow softener is the provision of means for backwashing the downflow bed so as to divide the water into two or more streams, one of which streams serves to carry the sediment to the drain, while the softening material is strained from the other stream or streams passing from the downflow bed over to the upflow bed, so that there is no movement of softening material from one bed to the other, as commonly occurs in two-flow softeners. It is also the aim during normal operation to utilize the strainer means both to permit rapid flow rate and reduce pressure loss through the softener, the strainers in the upflow bed serving to divide the flow at different elevations and retain the softening material, and the strainers in the downflow bed providing an inlet for water below the top of the bed so as to reduce pressure loss.

Still other objects and advantages of the invention will appear in the following description in which reference is made to the accompanying drawings, wherein—

Fig. 1 is a vertical section through a water softener made in accordance with my invention;

Fig. 2 is a sectional detail on the line 2—2 of Fig. 1, on a larger scale;

Fig. 3 is a view similar to Fig. 1, showing a water softener or filter of generally similar construction;

Fig. 4 is a horizontal section on the line 4—4 of Fig. 3;

Fig. 5 is a sectional view along the lines of Figs. 1 and 3, showing still another softener or filter.

Similar reference numerals are applied to corresponding parts throughout the views.

Figure 6:
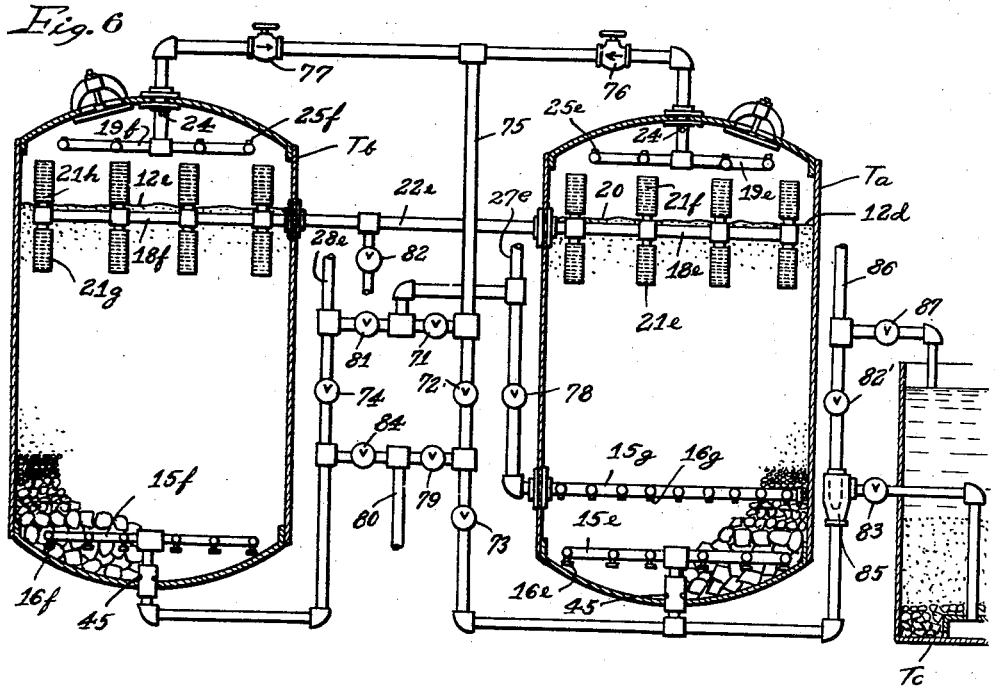
Figs. 6 and 7 are vertical sections through two-flow water softeners or other water conditioning apparatus made in accordance with my invention.

In the operation of conventional water softeners and filters, it is well known that the granular material grades itself in the upflow of water through the bed, so that the coarsest material is left on the bottom and the finest is found on top. It is difficult to keep a bed of this material in a clean and active condition unless one can cause the water to flow rapidly through it to keep the material loose and free to shift about, instead of becoming matted and packed. Such rapid flow heretofore called for additional freeboard space with a consequent added cost for the installation, and in some instances where an unusually high rate of flow was specified, the usual requirement of a fifty percent (50%) or more allowance for freeboard space frequently called for more head room than was available in the installation. The present invention, as previously indicated, provides efficient operation with greatly reduced freeboard space, and despite rapid flow rates and use of finer material avoids loss of filtering or softening material during backwashing, or the carrying of softening material to the service line in the case of an upflow softener operating with high flow rates, the resulting units being of smaller height as compared with old units of the same capacity.

Fig. 1 shows a tank T₁ which, while it is herein shown in connection with a brine tank B₁ in a downflow water softener installation, may, so far as the equipment therein is concerned, be considered in the same light as a filter, although of course the granular material indicated at 12 will in this case be zeolite water softening material. The tank's equipment otherwise, however, is adapted for filtering. The bed 12 is supported on a graded gravel bed 13 over a coarse bed 14 in which is disposed a bottom manifold 15 fitted with nozzles 16 and communicating with the pipe 17 extended into the center of the bottom of the tank. There are two manifolds 18 and 19 in the small freeboard space 20 in the top of the tank, the manifold 18 being appreciably below the manifold 19 and carrying a plurality of downwardly projecting strainer nozzles 21 surrounded by the water softening material at the top of the bed. The pipe 22 communicates with the manifold 18 through the side wall of the tank. Another pipe 23 communicates with the manifold 19 through the center of the top of the tank and has an air vent 24 therein above the level of the manifold 19. Nipples 25 serve as nozzles with fairly unrestricted openings on the manifold 19, whereas the strainers 21 have fine slits made therein, large enough only to allow passage of finer particles of sediment with the flow of water but small enough to retain even the finer water softening material in the tank. The raw water is delivered through a pipe 27 and the softened water is discharged to the service system through the pipe 28. Pipes 29 and 30 communicate with the drain, and the pipe 31 communicates with the ejector nozzle 32 to conduct brine from the tank B₁ through the pipe 33 communicating with the bottom of the tank. There are valves 34—39 to control the flow of water during softening and back-washing, and other valves 40—43 to control the brining and rinsing operations, in conjunction, of course, with the other valves.

In operation, during softening operation, valves 34, 36, 38, 40 and 41 are closed. Valves 35, 37, and 39 are open. This permits free flow of raw water from supply line 27 through pipe 23 into the tank T₁ through the nozzles 25 on the manifold 19 for passage downwardly through the bed 12 and out through the nozzles 16 on manifold 15 through pipe 17 to the service system communicating with the pipe 28. After the unit has been operated long enough to require regeneration, the direction of flow is reversed by closing valve 35 and opening valves 34, 36 and 38. This permits the incoming raw water from pipe 27 to enter the bottom of the tank and flow upwardly through the bed 12. A portion of the outgoing water, according to the regulation of the valves 36 and 37, will flow out through the strainers 21 which, as previously stated, are constructed to permit flow of water and sediment while retaining the softening material in the tank. The remaining sediment, being lighter than the softening material, is carried into the free-board space 20 with the remaining portion of the water going to the nozzles 25 on the manifold 19. The two streams from manifolds 18 and 19 both go through the drain pipe 29 to the sewer or other waste or drain receptacle. With this arrangement, it is obvious that the water can be passed through the coarser material of the bed 12 at a rate of say a ten gallon per minute per square foot area, sufficient to expand the whole bed so that no portions thereof are left matted and packed, and still the rate of outward flow through the manifolds 18 and 19 may be five gallons per minute per square foot area, assuming the valves 36 and 37 are adjusted so that half of the flow goes through the strainers 21 and the other half through the nozzles 25, although, of course, the flow may be divided in other proportions. The finer particles of the water softening material will not be carried up into the upper portion of the freeboard space 20 and there is accordingly no loss of such material to the drain; the flow rate toward the manifold 19 in the head space 20 is just enough to carry away the sediment freed by the rapid backwash flow of water through the bed, such sediment being lighter than the softening material. Once the accumulated sediment has been cleared out in this way and the bed broken up preparatory to the salt wash, the brine is introduced by opening the valves 40, 42 and 43 and valves 37 and 41, while the other valves are closed, excepting in cases where the softening material is so fine at the top of the bed that it sets up sufficient resistance to downward flow through the bed and interferes with easy ejection of brine from the tank B₁ into tank T₁. Under those conditions the valve 36 is opened also, so as to permit a portion of the brine to flow into the water softening material below the surface thereof and eliminate some of the back pressure. This is especially advantageous in those localities where the available water pressure is low. After enough brine has been added, valve 42 is closed and the brine is washed out in the usual way either entirely through valve 37 or jointly through valves 36 and 37, to the drain through valve 41. When the water issuing from valve 41 is soft, the unit can be placed back into service.

Where the bed 12 is purely a filter bed and there is no brine tank associated with the tank T₁, it is believed to be obvious that the operation as described above for backwashing preparatory to the salt wash and rinse would correspond to the backwashing of the filter bed to restore it to its initial clean state after the accumulated sediment on the top of the bed has dictated the necessity for backwashing. In the filtering operation, although the initial flow will be from manifold 19, the valve 36 being closed to prevent flow from manifold 18, one may relieve excessive back pressure, at least temporarily, by opening the valve 36 to allow the incoming water to enter the filter bed below the top thereof, and hence below the level of the accumulated sediment, so as to operate with reduced back pressure.

The unit illustrated in Fig. 3 is an upflow water softener and has a similar set of valves 34—41, and, of course, the pipe 31 communicates with a brine tank similar to the tank B₁ having a similar ejector nozzle 32 and valves 42 and 43. However, the incoming raw water supply pipe 27 in this case is below the valve 34, and the soft water service pipe 28 is above said valve. The tank T₂ has, in addition to the bottom manifold 15 (not shown), the two manifolds 18' and 19. The bed 12 of water softening material may extend approximately to the height shown, that is, to the lower ends of the strainers 21 which project upwardly from the manifold 18' into the freeboard space 20. Of course, the strainers 21 may project only partly above the top of the bed. When the unit is put into operation, and there is upflow of water through the bed 12, the bed expands in proportion to the flow of water and the mesh of the material and carries water softening material up and around the strainers 21. The valves 36 and 37 are regulated so as to permit the material to go as high as the tops of the strainers 21, but there will be insufficient flow of water upwardly beyond the strainers 21 to the manifold 19 to give rise to the danger of any water softening material being carried out to the serice pipe 28. In other words, there is a fast enough flow of water during softening to keep even the coarsest water softening material in an active condition, but the water flow is divided at the point of leaving the tank, the one stream going through the manifold 18' at a low enough flow rate to permit readily separating the water softening material from the outgoing water, without any tendency toward clogging of the strainer apertures, and the flow rate toward and through the manifold 19 being slow enough to avoid the likelihood of water softening material being entrained with the outgoing water at that point. I may, however, employ instead of the valves 36 and 37 a regulating proportioning valve to automatically regulate and proportion the flow of water from the tank through the manifolds 18' and 19. In regenerating, the brine can be admitted through pipe 31 for passage downwardly through the tank T₂ and out through the valve 41 similarly as in the case of the downflow unit described heretofore, or it may be ejected through valve 41 and passed upwardly through the tank T₂ and out to the drain through valve 38.

The unit shown in Fig. 5 is along the lines of the unit shown in Figs. 1 and 3, but has two manifolds 18b and 18c carrying two sets of strainers 21b and 21c, respectively, the first set projecting downwardly from the manifold 18b and the second set projecting upwardly from the manifold 18c, as shown, whereby to provide two series of outlets at two elevations, one below the level of the top of the filtering or softening medium 12b and the other above the same in the freeboard space 20b. The manifolds 18b and 18c are connected with pipes 22b and 22c fitted with valves 36b and 36c and adapted to discharge to the sewer or other waste receptacle through a pipe or pipes similar to the pipes 29 in Figs. 1 and 3. The other manifold 19b corresponds to the manifolds 19 of Figs. 1 and 3, and has similar nozzles 25 thereon projecting upwardly, as shown, the manifold being connected with a pipe 23b corresponding to the pipe 23 of Figs. 1 and 3. With this equipment it is obvious that the backwash flow can be divided into three streams, a portion being discharged through strainers 21b, a second portion through strainers 21c, and the remainder through nozzles 25, the valves 36b, 36c, and 37 being regulated to obtain the desired flow rate at each of the three levels. In that way, a sufficiently fast flow rate is permitted through the coarser material to keep it active and also insure good cleansing of the top of the bed, without danger of finer material being carried to the drain with the sediment that is being washed out. Of course, some of the sediment will find its way through the slots in the strainers 21b and some also through the slots in the strainers 21c, but the greater portion will doubtlessly be carried away with the water discharged through nozzles 25. Inasmuch as the strainers 21b are at a lower elevation than the strainers 21c, the slots therein may be slightly wider than the slots in strainers 21c, because the finer softening or filtering material will rise during backwashing and be adjacent the strainers 21c, and there will therefore be no danger of this finer material washing through the slots of strainers 21b. With the present construction, a back wash flow rate of fifteen gallons per minute per square foot area is permissible, which is sufficient to thoroughly agitate the coarser material and eliminate matting and channeling, whereas, in the unimproved softener and filter units, a flow rate of eight to ten gallons per minute per square foot area is usually permissible, and that is not fast enough to get the desired expansion and agitation of the bed. While I have described this unit as a downflow unit, backwashed with upflow, it is evident that an upflow softener may utilize such a system of strainers and nozzles at three elevations to as good advantage as the unit of Fig. 3 which employs a two-level system.

It will further be understood that in all of the units thus far described having strainers vertically disposed, the slots 26 in these nozzles may be made larger in the lower portion and smaller in the upper portion, or they may be of uniform size, depending upon the working conditions encountered with different grades of material. Variation in the size of the slots would be particularly useful in the case of strainers projecting upwardly in the freeboard space as in Figs. 3 and 5, because in those cases at the time of backwashing, the bed expands and the finer material is carried upwardly around the strainers, and it is therefore important that those slots be small enough to retain the material, whereas the other slots may be larger and permit of more efficiently discharging particles of sediment with the outgoing water.

Fig. 6 illustrates a two-flow softener having tanks T$_a$ and T$_b$ and a brine tank T$_c$. The two tanks T$_a$ and T$_b$ function as a combined unit which may be used for water softening alone, or for iron removal and water softening, filtering and taste and odor removal, etc. Thus, the material in the one tank may be for iron removal and the material in the other tank for water softening. In contrast to the present two-flow softeners, the beds in both tanks are confined, that is, there is no interchange of material from one tank to the other. There is, of course, a close relationship in the equipment in both of these tanks to what is disclosed in Figs. 1, 3 and 5. The raw water is supplied through the line $27e$ and valves $71$, $72$, and $73$ to the manifold $15e$ in the bottom of the tank $T_a$ from which the water is discharged through downwardly projecting nozzles $16e$ and openings $45$ for passage upwardly through the bed $12d$. The water thus softened or cleared of iron, depending upon the material of bed $12d$, is discharged through the strainers $21e$ and $21f$ on the manifold $18e$, the slots in the strainers being small enough to retain the material of the bed. The outgoing water passes through the connecting pipe $22e$ into the manifold $18f$ in tank $T_b$, and is discharged through the strainers $21g$ and $21h$ and travels downwardly through the bed $12e$ and out through the nozzles $16f$ on manifold $15f$ and also through holes $45$ and through valve $74$ to the service line $28e$. During this operation the full head of the water supply line is in line $75$, thereby sealing the one-way valves $76$ and $77$ so as to prevent flow of water from the extreme upper ends of the tanks $T_a$ and $T_b$ through manifolds $19e$ and $19f$, equipped with nozzles $25e$ and $25f$, respectively. During this operation, the water entering the bottom of tank $T_a$ causes sediment to accumulate in the gravel and quartz in the bottom of the tank. By closing the valve $72$ and opening the valves $78$ and $79$, a reverse current of water may be passed through the gravel and quartz through the manifold $15g$ which is equipped with downwardly projecting nozzles $16g$, this backwash water being discharged partly through the openings $45$ and partly through the nozzles $16e$ to the drain line $80$ to wash out the impurities present. Then by closing the valve $73$ and opening the valve $72$, the water delivered from manifold $15g$ can be passed upwardly through the bed $12d$. A portion of the water goes out through the strainers $21e$ and $21f$ and the rest goes out through manifold $19e$ and openings $24$ through the one-way valve $76$ to the line $75$ which communicates with the drain line $80$ through valves $72$ and $79$. There is at the same time an outward flow from the top of tank $T_b$ through manifold $19f$ and holes $24$ through the one-way valve $77$ to the line $75$ and thence to the drain line $80$. To backwash the bed $12e$, the valves $71$, $73$, and $78$ are closed and the valves $72$, $74$, $81$, and $79$ are opened. This permits water to flow from the raw water supply line $27e$ through the valves $81$ and $74$ into the bottom of the tank $T_b$ where it is distributed by the manifold $15f$ for passage upwardly through the bed $12e$. The water leaves the top of the tank $T_b$, a portion going out through the strainers $21g$ and $21h$ on the manifold $18f$ and the rest out through the strainers $21f$ on the manifold $19f$ and also through holes $24$ and through the one-way valve $77$ to the line $75$ which communicates through valves $72$ and $79$ with the drain line $80$. The water discharged from manifold $18f$ enters the top of tank $T_a$ through manifold $18e$, so that there is a simultaneous flow outwardly from the top of the tank $T_a$ through manifold $19e$ and holes $24$, through the one-way valve $76$ to the line $75$ and thence to drain line $80$. In that way sediment is eliminated from the tanks without loss of any of the material of beds $12d$ and $12e$, and it is obvious that since the flow is divided in the manner described, a much more rapid flow rate during backwashing is permitted. A valve $82$ is provided in the connecting pipe $22e$ between the two tanks $T_a$ and $T_b$ for the purpose of flushing to the drain any sediment that might accumulate within either of the manifold systems $18e$ and $18f$. If the unit is operated as a water softener and requires regeneration, or the adding of chemicals for sterilization of filtering material, or chemically treating for any purpose, such chemical may be delivered into the bottom of the tank $T_a$ by opening the valves $82'$ and $84$. All of the other valves will be closed. This will permit a free flow of the chemicals or brine solution through the valves $83$ and ejector $85$ into the bottom of the tank $T_a$ for passage upwardly through the bed $12d$, whereupon the flow is out through the manifold $18e$ over to the manifold $18f$ and down through the bed $12e$ and out through valve $84$ to the drain line $80$. When the valve $83$ is closed, the flow can be continued by leaving the valve $82'$ open and in that way the chemical or brine that has been added can be thoroughly washed out, after which the unit may be placed back into service. It is understood, of course, that the pipe $86$ will deliver clean raw water for the purpose stated and also for the purpose of replenishing the supply of water in the tank $T_c$ through valve $87$.

Figure 7:
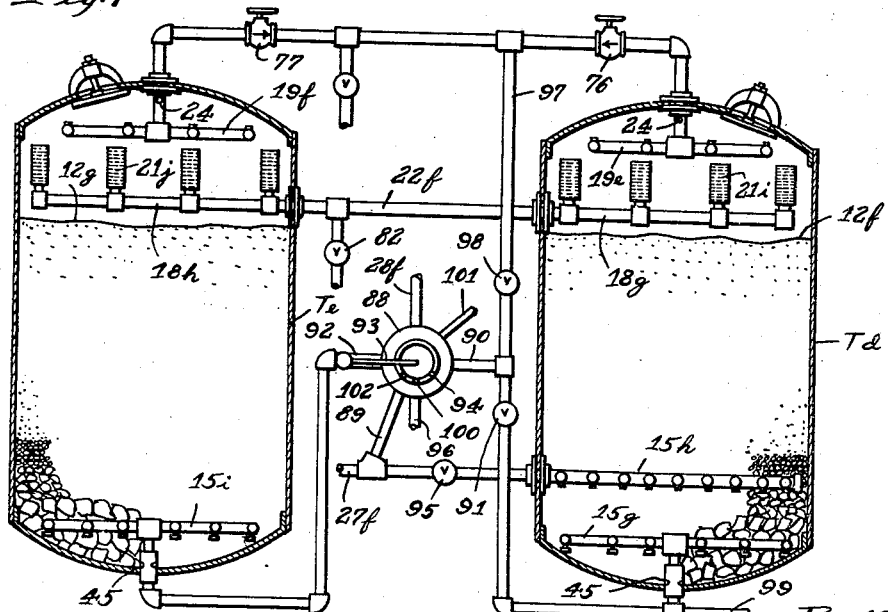

The unit shown in Fig. 7 is generally similar to that just described, but is equipped with a multiple port valve $88$ to replace a number of the hand operated valves required in Fig. 6. In this unit the manifolds $18g$ and $18h$ are both equipped with a single set of upwardly projecting strainers, as shown at $21i$ and $21j$. The same arrangement of manifolds $19e$ and $19f$ is shown as in Fig. 6. In operation, raw water is supplied through the pipe $27f$ and connection $89$ to the multiple port valve $88$ and flows out from the latter through the pipe $90$ through valve $91$ into the bottom of the tank $T_d$. The water flows upwardly through the bed $12f$ and out through the strainers $21i$ and manifold $18g$ through the connecting pipe $22f$ into tank $T_e$ where it is discharged from the strainers $21j$ on manifold $18h$ for passage downwardly through the material of the bed $12g$, finally issuing from the bottom of the tank $T_e$ and entering the multiple port valve $88$ through the pipe connection $92$ and being delivered to the service line $28f$. To backwash the gravel and quartz in the bottom of the tank $T_d$, the handle $93$ of the valve $88$ is moved from the service position shown over to the notch $94$ so as to reverse the direction of flow in the unit, and then by opening the valve $95$ the incoming raw water will be delivered into the manifold $15h$ for passage downwardly through the supporting gravel and quartz under the bed $12f$, to wash out the impurities through the manifold $15g$ and holes $45$ through valve $91$ and pipe connection $90$ to the valve $88$ and thence to the drain line $96$. After the bottom of the tank $T_d$ has thus been cleared of impurities, the valve $95$ can be closed, after which all of the incoming raw water is delivered by the valve $88$ into the bottom of the tank $T_e$ for passage upwardly in the bed $12g$. A portion of the water leaving the tank $T_e$ is conducted through strainers $21j$ on manifold $18h$ over to tank $T_d$ where it leaves the strainers $21i$ on manifold $18g$ and passes upwardly and out through the manifold $19e$ through the valve $76$ to the line $97$ which carries the waste water through the valve $98$ and pipe connection $90$ to the valve $88$ and thence to the drain $96$. The remainder of the water passing upwardly through the tank $T_e$ is discharged through the manifold 19f and openings 24 and flows through the valve 77 to the line 97 and thence to the drain 96. In that way, all suspended sediment, iron rust, and soluble impurities are carried to the drain, while the material of the beds is retained. The unit may be regenerated by the use of hand operated valves as described in connection with Fig. 6 which includes the brine tank $T_d$, ejector 85 and associated valves, which it should be understood may be connected with the line 99 communicating with the bottom of the tank $T_d$. Otherwise, the multiple port valve 88 may embody an ejector, and the handle 93 may be placed in the notch 100 for brining. With the handle in this position, brine is siphoned from the brine tank through the pipe connection 101 and passes through the pipe 90 into the bottom of the tank $T_d$ to flow upwardly through the bed 12f and out through manifold 18g into tank $T_e$ where it is passed downwardly through the bed 12g and flows out through pipe 92 and valve 88 to the drain line 96. After enough brine has been added, the handle 93 can be shifted to another notch 102 where the same direction of water flow through the unit is permitted without siphoning any brine, whereby to wash out the brine and released chemicals, or whatever solution is added for the sterilization or regeneration of the beds, the water traveling upwardly through tank $T_d$ and downwardly through tank $T_e$, to the drain 96. Finally, the handle 93 is shifted back to the position shown, placing the unit back in service.

Referring back to Fig. 5, the valve shown at 69 serves to admit air into the manifold 18c, for the purpose or aerating the freeboard space 20b for oxidation. 70 in this same figure designates an air relief valve for discharging air from the top of the unit. The valve 70 may be either hand operated or of an automatic type allowing air or gas to escape, but preventing discharge of water.

It is believed the foregoing description conveys a good understanding of the objects and advantages of my invention. The appended claims have been drawn with a view to covering all legitimate modifications and adaptations.

I claim:

1. Water treatment apparatus comprising in combination, a tank containing a bed of water conditioning material with a predetermined freeboard space left thereabove, a water distriubting and collecting manifold in the top of the freeboard space, water distributing and collecting means in the lower part of said tank, a water collecting manifold in the upper part of said tank carrying strainer nozzles spaced below the first-mentioned manifold, for discharging water from the tank through the second named water collecting manifold, while retaining the water conditioning material in the tank, conduits for conducting water from a source of supply to said distributing and collecting manifold, and said water distributing and collecting means, for conducting water from said tank through said collecting manifold, for conducting water from said manifolds and distributing and collecting means to waste, and for conducting water from said distributing and collecting means to a point of use, and valve means for controlling the flow of water through said conduits.

2. Water treatment apparatus as set forth in claim 1, wherein the conduit communicating with the first-mentioned manifold extends upwardly therefrom at the top of the tank, and has one or more openings provided therein at or near the highest point in the tank.

3. Water treatment apparatus comprising in combination, a tank containing a bed of water conditioning material with a predetermined freeboard space left thereabove, water distributing and collecting means in the lower part of said tank, a water distributing and collecting manifold in the top of the freeboard space, a second manifold in the upper part of said tank carrying strainer elements spaced below the first mentioned manifold, said strainer elements having restricted apertures, conduits for conducting water from a source of supply to said distributing and collecting manifold and said water distributing and collecting means, for conducting water from said tank through said second manifold, for conducting regenerating chemical solution to said first mentioned manifold, for conducting water from said manifolds and distributing and collecting means to waste, for conducting water from said distributing and collecting means to a point of use, and for conducting spent regenerating chemical solution through the water distributing and collecting means to waste, and valve means for controlling the flow of water and regenerating chemical solution through said conduits.

4. Water treatment apparatus comprising a tank containing a bed of water conditioning material with a predetermined freeboard space left thereabove small in height in relation to the height of the tank, the bed having supporting and distributing means therebeneath, a water distributing inlet manifold disposed in the top of the freeboard space in the tank, a second manifold spaced below the last named manifold in said tank carrying strainer elements projecting downwardly therefrom into the top portion of the bed of water conditioning material, conduits for conducting water from a source of supply to said water distributing inlet manifold, said second manifold, and said supporting and distributing means, for conducting water from said manifolds and supporting and distributing means to waste, and for conducting water from said supporting and distributing means to a point of use, and valve means for controlling the flow of water through said conduits.

5. Water treatment apparatus comprising in combination, a tank containing a bed of water conditioning material with a predetermined freeboard space left thereabove, a manifold in the top of the freeboard space carrying nozzles having relatively unrestricted apertures, a first conduit communicating with said manifold and extending from the tank, another manifold in the upper part of said tank below the first manifold carrying strainer nozzles having relatively restricted apertures for discharging water from the tank through the second manifold while retaining the water conditioning material in the tank, a second conduit communicating with the second manifold and extending from the tank, water distributing means in the lower part of said tank, a third conduit communicating with said water distributing means and extending from said tank, other conduits for conducting water from a source of supply to said tank through one of the aforesaid three conduits, for conducting water from said tank to a point of use through at least another one of the aforesaid three conduits, and for conducting water from said tank to waste through at least one of the aforesaid three conduits, and valve means for controlling the flow of water through all of said conduits.

6. Water softening apparatus comprising a tank containing water softening material with a predetermined freeboard space left thereabove, water distributing means in the lower part of said tank, a water collecting manifold in the top of the freeboard space in the tank, a second manifold spaced below the first manifold carrying strainer elements extending upwardly therefrom in the freeboard space above the top of the bed and terminating below and in spaced relation to the first named manifold, conduits for conducting water from a source of supply to said water collecting manifold and said water distributing means, for conducting water from said tank through said second manifold, for conducting water from said manifolds and water distributing means to waste, and for conducting water from said water distributing means to a point of use, and valve means for controlling the flow of water through said conduits so that the flow through the two manifolds may be independently regulated.

7. Water conditioning apparatus comprising a tank containing a bed of water conditioning material, water distributing means in the lower part of the tank, said tank having a freeboard space in the top thereof above the bed of water conditioning material, a water collecting manifold in the top of the freeboard space in the tank, a second manifold spaced below the first manifold and carrying strainer elements arranged to cooperate with the material in the top portion of the bed so as to retain the material in the tank during outflow of water therefrom, conduits for conducting water from a source of supply to said water collecting manifold and said water distributing means, for conducting water from said tank through said second manifold, for conducting water from said manifolds and water distributing means to waste, and for conducting water from said water distributing means to a point of use, and valve means for controlling the flow of water through said conduits, including independently adjustable valves for regulating the flow through each of said manifolds.

8. Water treatment apparatus comprising in combination, a tank containing a bed of water conditioning material with a predetermined freeboard space left thereabove, a manifold in the top of the freeboard space carrying nozzles having relatively unrestricted apertures, a first conduit communicating with said manifold and extending from the tank, another manifold in the upper part of said tank below the first manifold carrying strainer nozzles having relatively restricted apertures for discharging water from the tank through the second manifold while retaining the water conditioning material in the tank, a second conduit communicating with the second manifold and extending from the tank, water distributing means in the lower part of said tank, a third conduit communicating with said water distributing means and extending from said tank, other conduits for conducting water from a source of supply to said tank through one of the aforesaid three conduits, for conducting water from said tank to a point of use through at least another one of the aforesaid three conduits, for conducting regenerating chemical solution to said tank through at least one of the aforesaid three conduits, for conducting regenerating chemical solution from said tank to waste through another one of the aforesaid three conduits, and for conducting water from said tank to waste through at least one of the aforesaid three conduits, and valve means for controlling the flow of water and regenerating chemical solution through all of said conduits.

9. Water conditioning apparatus comprising a tank containing a bed of water conditioning material, water distributing means in the lower part of the tank, said tank having a freeboard space therein above the bed of water conditioning material, three manifolds disposed in vertically spaced relation in the upper part of the tank, one of said manifolds having strainer elements thereon projecting upwardly therefrom in the freeboard space above the bed of water conditioning material, the second of said manifolds having strainer elements thereon projecting downwardly therefrom into the top portion of the bed of water conditioning material, the strainer elements providing restricted openings for outflow of water therethrough while retaining the water conditioning material in the tank, the third manifold being at a higher elevation in the freeboard space above the other manifolds and having relatively unrestricted openings provided therein, conduits for conducting water from a source of supply to said third manifold and said water distributing means, for conducting water from said tank through said first and second manifolds, for conducting water from all of said manifolds and water distributing means to waste, and for conducting water from said water distributing means to a point of use, and valve means for controlling the flow of water through said conduits.

10. Water conditioning apparatus as set forth in claim 9, wherein the conduit communicating with the third manifold extends downwardly from the top of the tank and has one or more openings provided therein at or near the highest point in the tank.

11. Water treatment apparatus comprising, in combination, a pair of tanks, each tank containing a bed of water conditioning material, water distributing means in the lower part of each tank, a water distributing manifold in each of said tanks spaced below the tops thereof carrying strainer elements, means interconnecting said manifolds for water flow from the top portion of one tank to the top portion of the other, said strainer elements serving to retain the water conditioning material in the respective tanks, a water collecting manifold above the water distributing manifold in each of said tanks in closely spaced relation to the tops thereof having relatively unrestricted openings provided therein, conduits for conducting water from a source of supply to said water distributing means, for conducting water from said water collecting manifolds and water distributing manifolds to waste, and for conducting water from said water distributing means to a point of use, and valve means for controlling the flow of water through said conduits.

12. Water treatment apparatus as set forth in claim 11, wherein the conduits communicating with the water collecting manifolds extend downwardly from the tops of the tanks, and each has one or more openings provided therein at or near the highest point in the tank.

13. Water treatment apparatus as set forth in claim 11, wherein each of the water distributing manifolds is located at approximately the level of the top of the associated bed of water conditioning material and has some of the strainer elements projecting upwardly therefrom in the freeboard space above the bed of water conditioning material and has the rest of the strainer elements projecting downwardly therefrom in the top portion of the bed of water conditioning material.

14. Water conditioning apparatus as set forth in claim 11, wherein each of the water distributing manifolds is located at about the level of the top of the associated bed of water conditioning material and has the strainer elements thereon projecting upwardly therefrom in the freeboard space in the tank.

15. Water treatment apparatus comprising, in combination, a pair of tanks, each tank containing a bed of water conditioning material, water distributing means in the lower part of each tank, a water distributing manifold in each of said tanks spaced below the tops thereof carrying strainer elements, means interconnecting said manifolds for water flow from the top portion of one tank to the top portion of the other, said strainer elements serving to retain the water conditioning material in the respective tanks, a water collecting manifold above the water distributing manifold in each of said tanks in closely spaced relation to the tops thereof having relatively unrestricted openings provided therein, conduits connected to the water collecting manifolds, a check valve in each of said conduits opening outwardly with respect to the water collecting manifold associated therewith, conduits for conducting water from a source of supply to said water distributing means and to said check valves to close the same, for conducting water from said water collecting manifolds and water distributing manifolds to waste, and for conducting water from said water distributing means to a point of use, and valve means for controlling the flow of water through said conduits.

16. Water treatment apparatus comprising a tank containing a bed of water conditioning material with a predetermined freeboard space left thereabove, water distributing and collecting means in the top part of the freeboard space and having relatively unrestricted openings, water collecting means in the lower part of the freeboard space and having relatively restricted openings for discharging water from the tank while retaining water conditioning material in the tank, water distributing means in the bottom portion of said tank, conduits for conducting water from a source of supply to said water distributing and collecting means and said water distributing means, for conducting water from said tank through said water collecting means, for conducting water from said water collecting means and said water distributing and collecting means to waste, and for conducting water from said water distributing means to a point of use, and valve means for controlling the flow of water through said conduits.

17. Water treatment apparatus comprising a tank containing a bed of water conditioning material with a predetermined freeboard space left thereabove, water distributing and collecting means in the top part of the freeboard space and having relatively unrestricted openings, water collecting means disposed in the upper portion of the tank but spaced below the last named means and having relatively restricted openings for discharging water from the tank while retaining water conditioning material in the tank, water distributing means in the bottom portion of said tank, conduits for conducting water from a source of supply to said water distributing and collecting means, said water collecting means, and said water distributing means, for conducting water from said water distributing and collecting means, said water collecting means, and said water distributing means to waste, and for conducting water from said water distributing means to a point of use, and valve means for controlling the flow of water through said conduits.

18. Water treatment apparatus comprising a tank containing a bed of water conditioning material with a predetermined freeboard space left thereabove, water distributing and collecting means in the top part of the freeboard space and having relatively unrestricted openings, manifold means in the upper portion of the tank and having elongated strainer elements thereon extending substantially vertically, the strainer elements having restricted openings which in the outgo of water therethrough from the tank serve to retain the water conditioning material in the tank, the openings being in vertically spaced relation along the length of said strainer elements, water distributing means in the bottom portion of said tank, conduits for conducting water from a source of supply to said water distributing and collecting means and said water distributing means, for conducting water from said tank through said manifold means, for conducting water from said manifold means, said water distributing and collecting means, and said water distributing means to waste, and for conducting water from said water distributing means to a point of use, and valve means for controlling the flow of water through said conduits.

19. Water treatment apparatus comprising in combination, a pair of tanks, each containing a bed of water conditioning material with a predetermined freeboard space left thereabove, water distributing means in the lower part of each tank, water distributing and collecting means in the upper portion of each tank having relatively restricted openings so that water may be discharged from the tank while retaining water conditioning material in the tank, water collecting means in the upper portion of the tank above the last-mentioned means having relatively unrestricted openings, means interconnecting the water distributing and collecting means for water flow from the upper portion of one tank to the upper portion of the other, conduits for conducting water from a source of supply to said water distributing means, for conducting water from said water collecting means and water distributing and collecting means to waste, and for conducting water from said water distributing means to a point of use, and valve means for controlling the flow of water through said conduits.

20. Water treatment apparatus, as set forth in claim 15, wherein the conduits communicating with the water collecting manifolds extend downwardly from the tops of the tanks and each has one or more openings provided therein at or near the highest point in the tank.

CHESTER T. McGILL.